United States Patent
Makita et al.

(10) Patent No.: US 12,440,100 B2
(45) Date of Patent: Oct. 14, 2025

(54) IMAGE GENERATION DEVICE, PROGRAM, AND IMAGE GENERATION METHOD

(71) Applicant: University of Tsukuba, Tsukuba (JP)

(72) Inventors: Shuichi Makita, Tsukuba (JP); Yoshiaki Yasuno, Tsukuba (JP)

(73) Assignee: University of Tsukuba, Tsukuba (JP)

( * ) Notice: Subject to any disclaimer, the term of this patent is extended or adjusted under 35 U.S.C. 154(b) by 477 days.

(21) Appl. No.: 17/999,999

(22) PCT Filed: May 25, 2021

(86) PCT No.: PCT/JP2021/019771
§ 371 (c)(1),
(2) Date: Nov. 28, 2022

(87) PCT Pub. No.: WO2021/241564
PCT Pub. Date: Dec. 2, 2021

(65) Prior Publication Data
US 2023/0200643 A1 Jun. 29, 2023

(30) Foreign Application Priority Data
May 29, 2020 (JP) .................. 2020-094055

(51) Int. Cl.
*A61B 3/12* (2006.01)
*A61B 3/00* (2006.01)
*A61B 3/10* (2006.01)

(52) U.S. Cl.
CPC .......... *A61B 3/1241* (2013.01); *A61B 3/0025* (2013.01); *A61B 3/102* (2013.01)

(58) Field of Classification Search
CPC ...... A61B 3/1241; A61B 3/0025; A61B 3/102
(Continued)

(56) References Cited

U.S. PATENT DOCUMENTS

| 9,697,603 B2 * | 7/2017 | Reynolds ................. G06T 5/92 |
| 2009/0073386 A1 * | 3/2009 | Petito ................... A61B 3/0025 351/243 |

(Continued)

FOREIGN PATENT DOCUMENTS

| JP | 2014147780 A | 8/2014 |
| JP | 2016209200 A | 12/2016 |

(Continued)

OTHER PUBLICATIONS

International Search Report for corresponding PCT application No. PCT/JP2021/019771 dated Jul. 19, 2021.
(Continued)

*Primary Examiner* — Mohammed A Hasan
(74) *Attorney, Agent, or Firm* — McDonnell Boehnen Hulbert & Berghoff LLP

(57) ABSTRACT

An image generation device includes a tomographic image acquisition unit configured to acquire an OCTA tomographic image that captures a distribution of a blood flow of an object, a light attenuation acquisition unit configured to acquire a light attenuation of measurement light emitted to the object in a direction in which the tomographic image is layered, and an image generation unit configured to generate a light attenuation-blood flow distribution chart indicating a distribution of the light attenuation based on the acquired OCTA tomographic image and the light attenuation.

12 Claims, 12 Drawing Sheets

(58) Field of Classification Search
USPC .......................................................... 351/206
See application file for complete search history.

(56) References Cited

U.S. PATENT DOCUMENTS

| | | | |
|---|---|---|---|
| 2012/0147326 A1* | 6/2012 | Yatagai | A61B 3/1225 351/206 |
| 2014/0204341 A1* | 7/2014 | Murase | A61B 3/1025 351/208 |
| 2014/0218686 A1 | 8/2014 | Reisman | |
| 2016/0317016 A1 | 11/2016 | Oishi | |
| 2017/0319060 A1 | 11/2017 | Huang | |
| 2018/0228552 A1 | 8/2018 | Milner | |
| 2019/0130170 A1* | 5/2019 | Makihira | G06T 7/0016 |
| 2019/0274542 A1* | 9/2019 | Imamura | A61B 3/102 |

FOREIGN PATENT DOCUMENTS

| | | |
|---|---|---|
| JP | 6371762 | 7/2018 |
| WO | 2019203091 A1 | 10/2019 |

OTHER PUBLICATIONS

European Search Report for corresponding European application No. EP21812735.5, dated May 14, 2024.

* cited by examiner (A) OCT (B) OCTA (A) RETINAL OCTA (B) CHOROIDAL OCTA

IMAGE GENERATION DEVICE, PROGRAM, AND IMAGE GENERATION METHOD

CROSS-REFERENCE TO RELATED APPLICATIONS

The present application is a U.S. National Phase Application pursuant to 35 U.S.C. § 371 of PCT International Application No. PCT/JP2021/019771 filed May 25, 2021, which claims priority to Japanese Patent Application No. 2020-094055, filed May 29, 2020, the contents of each of which are incorporated herein by reference.

TECHNICAL FIELD

The present invention relates to an image generation device, a program, and an image generation method.

BACKGROUND ART

A technique has been known that generates a tomographic image of an object by using an optical coherence tomography device (hereinafter referred to as an OCT device) that scans an object such as the fundus oculi. Another technique (OCT angiography) has also been known that extracts a blood flow of an object by using the tomographic image of the object generated by the OCT device (see, for example, Patent Document 1). According to the known techniques, an OCTA image similar to an image obtained by contrast radiography can be obtained without using a contrast agent by imaging temporal changes in an OCT signal obtained by the OCT device.

CITATION LIST

Patent Literature

Patent Document 1: Japanese Patent No. 6371762

SUMMARY OF INVENTION

Technical Problem

When the technique described above is used, information of a three-dimensional space of an object is carefully examined using an OCT image in which a tissue structure is represented and an OCTA image in which a blood flow is represented. That is, in order to carefully examine the information of the three-dimensional space of the object using the related art, it was necessary to carefully examine a plurality of tomographic images one by one.

In order to examine abnormal characteristics of an object, there is a demand for displaying information of a three-dimensional space of the object so that the information can be easily examined.

The present invention has been made in view of such circumstances, and an object thereof is to provide a technique for generating a two-dimensional image and thus allowing recognition of whether an object has an abnormal part, by observing one two-dimensional image without observing a plurality of tomographic images one by one, each of the tomographic images representing a three-dimensional structure of the object.

Solution to Problem

An image generation device according to an aspect of the present invention includes a tomographic image acquisition unit configured to acquire an OCTA tomographic image that captures a distribution of a blood flow of an object, a light attenuation acquisition unit configured to acquire the light attenuation of measurement light emitted to the object in a direction in which the OCTA tomographic image is layered, and an image generation unit configured to generate a light attenuation-blood flow distribution chart indicating a distribution of the light attenuation based on the acquired OCTA tomographic image and the light attenuation.

Further, in the image generation device according to the aspect of the present invention, the light attenuation-blood flow distribution chart is a two-dimensional image.

Further, in the image generation device according to the aspect of the present invention, the two-dimensional image is an image colored in accordance with a level of light attenuation.

Further, the image generation device according to the aspect of the present invention further includes an output unit configured to output the generated light attenuation-blood flow distribution chart.

Further, in the image generation device according to the aspect of the present invention, the light attenuation acquisition unit includes an OCT image acquisition unit that acquires an OCT image that captures the object, an OCT intensity signal calculation unit that calculates an OCT intensity signal based on the acquired OCT image, and a light attenuation calculation unit that calculates the light attenuation based on the calculated OCT intensity signal.

Further, in the image generation device according to the aspect of the present invention, the image generation unit generates the light attenuation-blood flow distribution chart by integrating a value based on a power of the light attenuation in a direction in which the OCTA tomographic image is layered.

Further, in the image generation device according to the aspect of the present invention, the image generation unit calculates a colored image E, which is the light attenuation-blood flow distribution chart, in accordance with Equation (100):

[Math. 1]

$$E = \Sigma_z \mathrm{OCTA}(z) \times T[A^{10}(z)] \qquad (100)$$

wherein, T represents a predetermined function, A(z) represents the light attenuation, z represents a position in a direction in which the OCTA tomographic image is layered, and OCTA(z) represents an OCTA signal.

Further, the image generation device according to the aspect of the present invention further includes an operation reception unit configured to receive an operation from a user, in which the image generation unit generates the light attenuation-blood flow distribution chart by setting an index of the light attenuation equal to a value acquired through the operation from the user using the operation reception unit.

Further, a program according to an aspect of the present invention causes a computer to perform acquiring an OCTA tomographic image that captures a distribution of a blood flow of an object, acquiring a light attenuation of measurement light emitted to the object in a direction in which the OCTA tomographic image is layered, and generating a light attenuation-blood flow distribution chart indicating the distribution of the light attenuation based on the acquired OCTA tomographic image and the light attenuation.

Further, an image generation method according to an aspect of the present invention includes acquiring an OCTA tomographic image that captures the distribution of a blood flow of an object, acquiring the light attenuation of measurement light emitted to the object in a direction in which the OCTA tomographic image is layered, and generating a light attenuation-blood flow distribution chart indicating a distribution of the light attenuation based on the acquired OCTA tomographic image and the light attenuation.

Advantageous Effects of Invention

According to the present invention, it is possible to generate an image from which information of a three-dimensional space of an object can be easily obtained.

DESCRIPTION OF EMBODIMENTS

First Embodiment

Hereinafter, a first embodiment of the present invention will be described with reference to the drawings.

Figure 1:
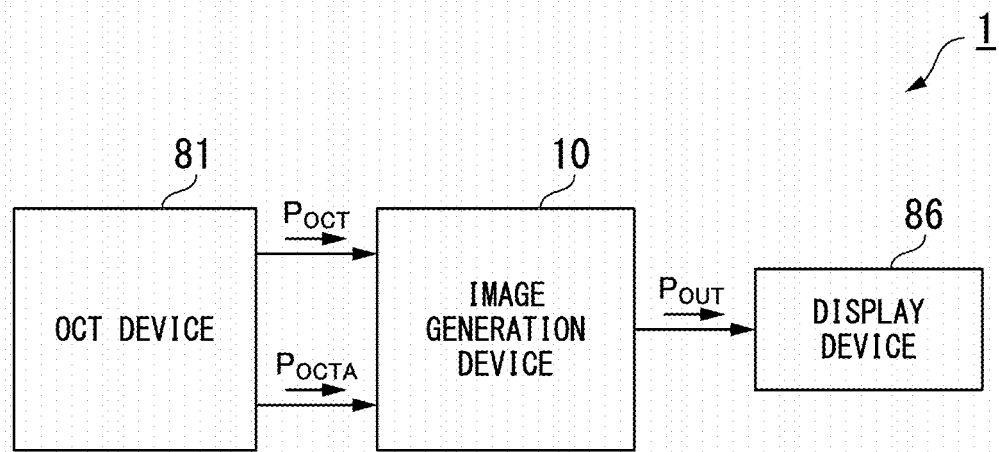
FIG. 1 is a diagram illustrating an example of a system configuration of an image generation system according to a first embodiment.

FIG. 1 is a diagram illustrating an example of a system configuration of an image generation system 1 according to the present embodiment. An example of the system configuration of the image generation system 1 will be described with reference to the drawing. The image generation system 1 generates an image from which information on a three-dimensional space of an object can be easily obtained, based on an OCT image of the object obtained by optical coherence tomography (OCT). In the present embodiment, an example of a case where an object is an eyeball is described as an example of an object. The present embodiment is not limited to this example, and can be used for various test objects.

The image generation system 1 includes an OCT device 81, an image generation device 10, and a display device 86.

The OCT device 81 irradiates an object with measurement light to acquire an OCT signal $S_{OCT}$ based on an interference state between reflected light reflected from the object and reference light corresponding to the measurement light. The OCT device 81 generates an OCT image $P_{OCT}$ based on the acquired OCT signal $S_{OCT}$. The OCT image $P_{OCT}$ is a tomographic image representing a three-dimensional structure of an object.

The OCT device 81 provides at least any one of the OCT signal $S_{OCT}$ or the OCT image $P_{OCT}$ to the image generation device 10. In this example, for example, an example in which the OCT device 81 provides the OCT image $P_{OCT}$ to the image generation device 10 will be described.

In addition, the OCT device 81 images temporal changes in the acquired OCT signal $S_{OCT}$ to obtain an OCTA (OCT angiography) image $P_{OCTA}$ similar to an image obtained by contrast radiography without using a contrast agent. That is, the OCTA image $P_{OCTA}$ is a tomographic image representing a three-dimensional blood flow distribution of an object.

The OCT device 81 provides at least any one of the OCTA signal $S_{OCTA}$ or the OCTA image $P_{OCTA}$ to the image generation device 10. The OCTA signal $S_{OCTA}$ is a signal used to generate the OCTA image $P_{OCTA}$. In this example, for example, an example of a case where the OCT device 81 provides the OCTA image $P_{OCTA}$ to the image generation device 10 will be described.

The image generation device 10 acquires the OCT signal $S_{OCT}$ or the OCT image $P_{OCT}$ representing a three-dimensional structure of the object and the OCTA signal $S_{OCTA}$ or the OCTA image $P_{OCTA}$ representing a blood flow of the object from the OCT device 81. The image generation device 10 outputs an output image $P_{OUT}$ representing a three-dimensional structure and a blood flow of the object based on the acquired OCT signal $S_{OCT}$ or the OCT image $P_{OCT}$ and OCTA signal $S_{OCTA}$ or OCTA image $P_{OCTA}$. The output image $P_{OUT}$ is an image displayed so that information of the three-dimensional space of the object can be easily examined. For example, the output image $P_{OUT}$ is a two-dimensional image. Specifically, the output image $P_{OUT}$ may be a two-dimensional image representing a blood flow distribution and a light attenuation at a depth in the blood flow using colors or the like.

The display device 86 displays the output image $P_{OUT}$ output by the image generation device 10. For example, the display device 86 is a liquid crystal display or the like.

Note that the image generation system 1 may be configured to include a storage device, which is not illustrated in the drawing, instead of including the display device 86 and store the output image $P_{OUT}$ output by the image generation device 10. The storage device may be connected via a network which is not illustrated in the drawing. In the present embodiment, an example of a case where the image generation device 10 outputs the output image $P_{OUT}$ to the display device 86 will be described.

Figure 2:
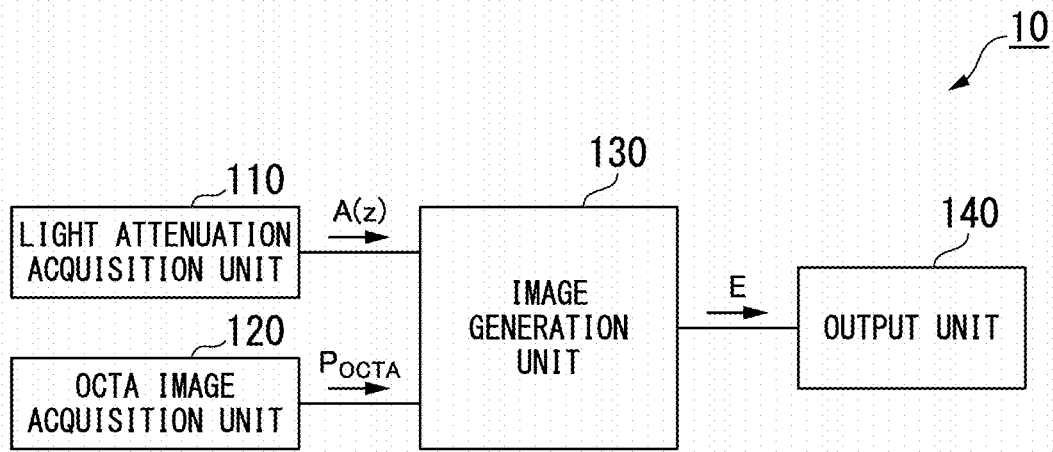
FIG. 2 is a diagram illustrating an example of a functional configuration of an image generation device according to the first embodiment.

FIG. 2 is a diagram illustrating an example of a functional configuration of the image generation device 10 according to the first embodiment. An example of the functional configuration of the image generation device 10 will be described with reference to the drawing.

The image generation device 10 includes a light attenuation acquisition unit 110, an OCTA image acquisition unit (tomographic image acquisition unit) 120, an image generation unit 130, and an output unit 140.

The light attenuation acquisition unit 110 acquires a light attenuation A(z) of measurement light emitted when the OCT device 81 acquires the OCT signal $S_{OCT}$. The OCT device 81 emits the measurement light at least in a direction in which the OCTA tomographic image is layered (in a depth direction of the object). That is, the light attenuation acquisition unit 110 acquires the light attenuation A(z) of the measurement light emitted to the object in a direction in which the OCTA tomographic image is layered. The light attenuation A(z) is a value based on a position z in a direction in which the tomographic image is layered (a depth in a depth direction of the object).

The OCTA image acquisition unit 120 acquires the OCTA signal $S_{OCTA}$ or the OCTA image $P_{OCTA}$ obtained from the object by the OCT device 81. The OCTA image $P_{OCTA}$ is an OCTA tomographic image that captures a distribution of a blood flow of the object. That is, the OCTA image acquisition unit 120 acquires an OCTA tomographic image that captures the distribution of blood flow of the object.

The image generation unit 130 generates the output image $P_{OUT}$ based on the acquired light attenuation A(z), the OCTA signal $S_{OCTA}$, or the OCTA image $P_{OCTA}$. The output image $P_{OUT}$ is a light attenuation-blood flow distribution chart based on the blood flow included in the OCTA signal $S_{OCTA}$ or the OCTA image $P_{OCTA}$, and the light attenuation in the depth. The output image $P_{OUT}$ is, for example, a two-dimensional image. In addition, the output image $P_{OUT}$ is patterned and imaged by the light attenuation corresponding to the depth z in a direction in which the tomographic image is layered based on a predetermined function. That is, the image generation unit 130 generates a two-dimensional image that is patterned by the blood flow included in the OCTA signal $S_{OCTA}$ or the OCTA image $P_{OCTA}$ and the light attenuation in the depth, based on the acquired OCTA signal $S_{OCTA}$ or OCTA image $P_{OCTA}$ (OCTA tomographic image) and the light attenuation A(z). In order to facilitate the recognition of an image, the image may be a two-dimensional image that is colored based on light attenuation. Hereinafter, a two-dimensional image generated by the image generation unit 130 will be referred to as a colored image E. The colored image E is an example of the output image $P_{OUT}$. The colored image E is calculated by Equation (1) below.

[Math. 2]

$$E = \Sigma_z OCTA(z) \times T[A^{10}(z)] \quad (1)$$

A function T in Equation (1) is an operation of converting a passed argument, and is an operation of selecting one from a color table that is a one-dimensional array of three-dimensional vectors by, for example, red, green, and blue (RGB).

In the case of coloring, the selection of a color is performed based on the power of the light attenuation A(z). As shown in Equation (1), the colored image E may be calculated by multiplying, for example, an OCTA signal which is a three-dimensional blood flow signal by a color vector based on the power of the light attenuation A(z). In a case where a color table is used for the function T, the light attenuation A(z) is converted into an index ([0, 1, 2, 2,]) indicating the position of an element in the array, and a specific color is selected. That is, the colored image E can be calculated by determining the color based on the light attenuation A(z) and integrating three-dimensional data weighted by a blood flow signal OCTA(z) in the direction of the depth z.

Note that, in the example shown in Equation (1), an example of a case where the color table T is a value based on 10th power of the light attenuation A(z) is described, but the index of the light attenuation A(z) is not limited to this example. The index of the light attenuation A(z) becomes larger, a change in the colored image E becomes larger even when a change in the blood flow of the object is small. In addition, as the index of the light attenuation A(z) becomes smaller, a change in the colored image E becomes smaller even when a change in the blood flow of the object is large. In addition, a change in the blood flow signal OCTA changes the brightness of the colored image E. That is, the visibility of the colored image E is adjusted by the index of the light attenuation A(z). For example, the index of the light attenuation A(z) may be set to a predetermined value for each type of test object.

As shown in Equation (1), the image generation unit 130 calculates a colored image E, which is a light attenuation-blood flow distribution chart, based on the predetermined function T, the light attenuation A(z), the position z in a direction in which the OCTA tomographic image is layered, and the OCTA signal OCTA (z).

The output unit 140 outputs a two-dimensional image (for example, the colored image E) generated by the image generation unit 130. In the present embodiment, the output unit 140 outputs the colored image E to the display device 86 and causes the display device 86 to display the colored image E.

Figure 3:
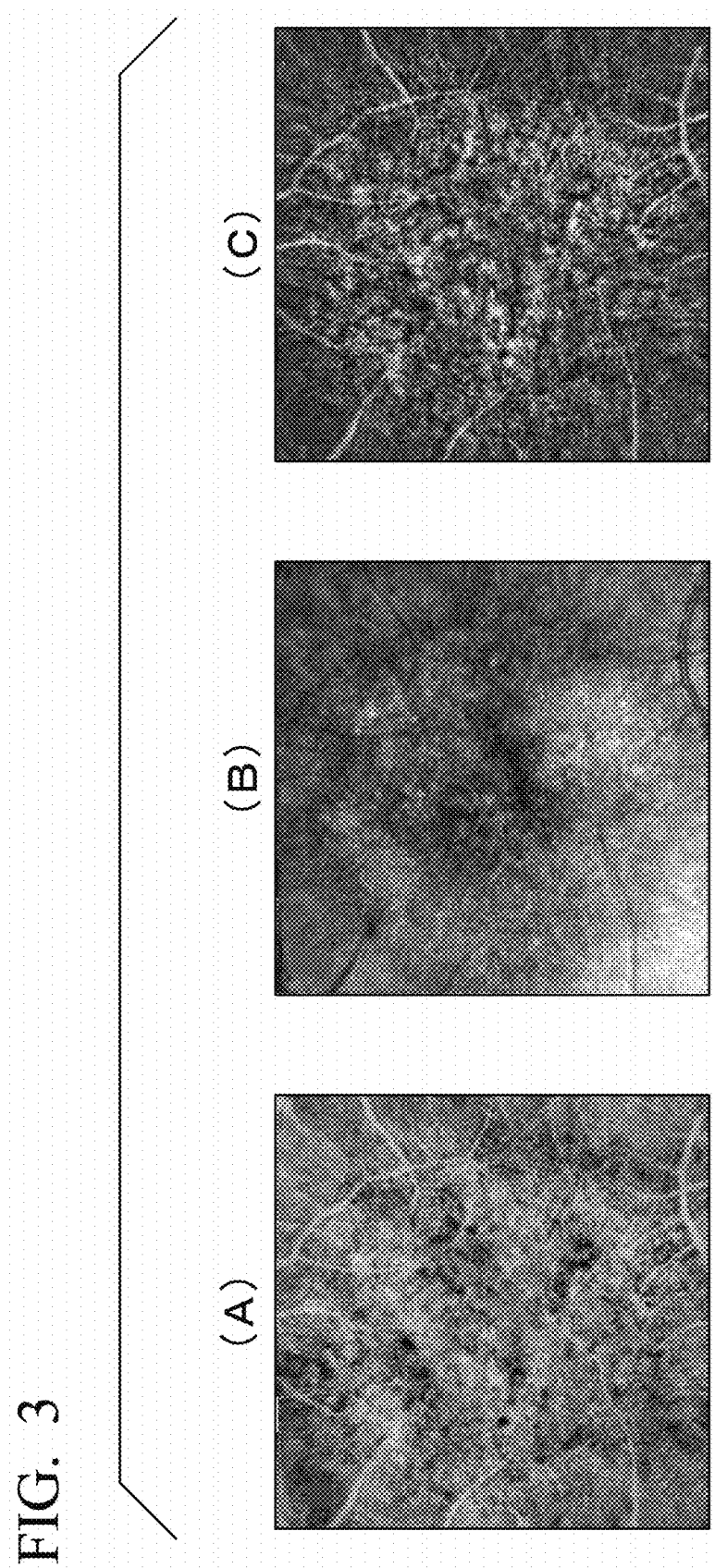
FIG. 3 is a diagram illustrating an example of a colored image which is output by the image generation device according to the first embodiment.

FIG. 3 is a diagram illustrating an example of the colored image E which is output by the image generation device 10 according to the first embodiment. An example of the colored image E which is output by the image generation device 10 will be described with reference to the drawing. FIGS. 3(A) to 3(C) are diagrams illustrating results of imaging a portion of an eyeball which is an object.

FIG. 3(A) is a diagram illustrating an example of the colored image E in the present embodiment. As illustrated in the drawing, in the colored image E, a three-dimensional structure and a blood flow of the object can be simultaneously recognized by colors. In addition, the colored image E is one two-dimensional image, rather than a tomographic image constituted by a plurality of two-dimensional images.

FIG. 3(B) is an example of a projection view of an OCT tomographic image in the related art. In the drawing, a two-dimensional structure of an object is illustrated. In an OCT projection image in the related art, a three-dimensional structure of the object cannot be recognized. In addition, a blood flow cannot be recognized.

FIG. 3(C) is an example of an OCTA image in the related art. In the drawing, a blood flow is illustrated. The OCTA image in the related art is generally a projection view in the depth direction, and thus the depth of a blood flow within an integration range cannot be recognized. In addition, a distribution other than the blood flow of the object cannot be recognized.

Figure 4:
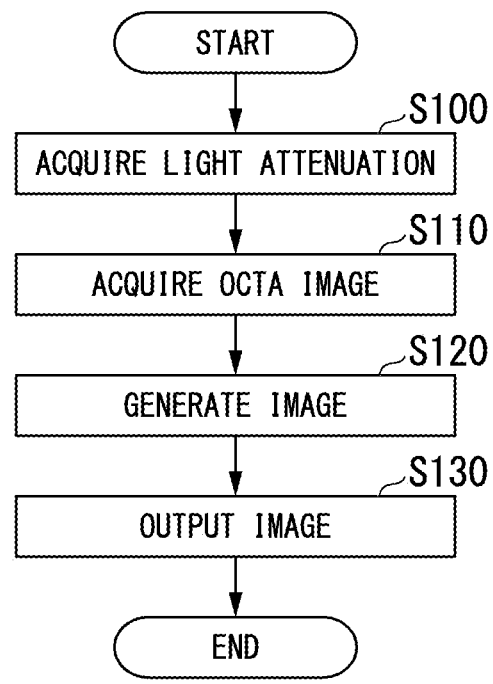
FIG. 4 is a diagram illustrating an example of a series of operations of the image generation device according to the first embodiment.

FIG. 4 is a diagram illustrating an example of a series of operations of the image generation device 10 according to the first embodiment. A series of operations of the image generation device 10 will be described with reference to the drawing. (Step S100) The light attenuation acquisition unit 110 acquires the light attenuation A(z). For example, the light attenuation acquisition unit 110 acquires the light attenuation A(z) from the OCT device 81.

(Step S110) The OCTA image acquisition unit 120 acquires the OCTA signal $S_{OCTA}$ or the OCTA image $P_{OCTA}$. For example, the OCTA image acquisition unit 120 acquires the OCTA signal $S_{OCTA}$ or the OCTA image $P_{OCTA}$ from the OCT device 81.

(Step S120) The image generation unit 130 generates the colored image E based on the acquired light attenuation A(z) and OCTA signal $S_{OCTA}$ or OCTA image $P_{OCTA}$. For example, the image generation unit 130 generates the colored image E based on Equation (1).

(Step S130) The output unit 140 outputs the colored image E generated by the image generation unit 130. For example, the output unit 140 outputs the colored image E to the display device 86, and causes the display device 86 to display the colored image E.

Summary of First Embodiment

According to the above-described embodiment, the image generation device 10 includes the light attenuation acquisition unit 110 and the OCTA image acquisition unit 120 to acquire the light attenuation A(z) and the OCTA signal $S_{OCTA}$ or OCTA image $P_{OCTA}$. The image generation device 10 includes the image generation unit 130 to generate the colored image E based on the acquired light attenuation A(z) and OCTA signal $S_{OCTA}$ or OCTA image $P_{OCTA}$. The image generation device 10 outputs the colored image E as an output image $P_{OUT}$. The colored image E is a two-dimensional image in which the three-dimensional structure and the blood flow of the object are represented. That is, according to the present embodiment, the image generation device 10 can generate a two-dimensional image in which the three-dimensional structure and the blood flow of the object are represented, using the light attenuation A(z), and the OCTA signal $S_{OCTA}$ or the OCTA image $P_{OCTA}$ which are acquired from the OCT device 81.

Further, according to the above-described embodiment, the image generation device 10 can generate a two-dimensional image in which the three-dimensional structure and the blood flow of the object are represented, and thus it is possible to easily perform highly accurate test object image diagnosis. In addition, according to the present embodiment, it is possible to easily perform highly accurate test object image diagnosis, and thus it is possible to improve the accuracy of diagnosis. In addition, according to the present embodiment, highly accurate test object image diagnosis can be easily performed, and thus it is possible to easily find an abnormality in the object and suppress overlooking of an abnormality in the object.

Further, according to the above-described embodiment, the image generation device 10 generates the colored image E based on information acquired from the OCT device 81. That is, according to the present embodiment, the image generation device 10 can be add-on mounted on the OCT device 81, and thus the image generation device 10 can be easily applied to devices that have been used in the related art. Thus, according to the present embodiment, the image generation device 10 can be easily add-on mounted on devices of the related art without introducing a new device.

In addition, according to the present embodiment, the image generation device 10 can be applied as an option configuration for a device that has been used in the related art.

In addition, according to the embodiment described above, the object is an eyeball. In addition, the two-dimensional image output by the image generation device 10 is an image in which a distribution of a blood flow in the eyeball which is an object is represented by brightness, and light attenuation at the depth in a direction in which the tomographic image of the blood flow is layered is represented by colors.

Thus, according to the present embodiment, it is possible to rapidly recognize a three-dimensional structure and a blood flow of the eyeball by confirming on two-dimensional image without confirming a plurality of stacked images without omission as in the related art at the time of diagnosing the three-dimensional structure and the blood flow of the eyeball, and it is only required that a tomographic image is confirmed only when it is determined that details need to be accurately examined. That is, according to the present embodiment, in a case where the three-dimensional structure and the blood flow of the eyeball are diagnosed, it is possible to omit troublesome work such as confirming a plurality of tomographic images without omission.

Second Embodiment

Hereinafter, a second embodiment of the present invention will be described with reference to the drawings.

Figure 5:
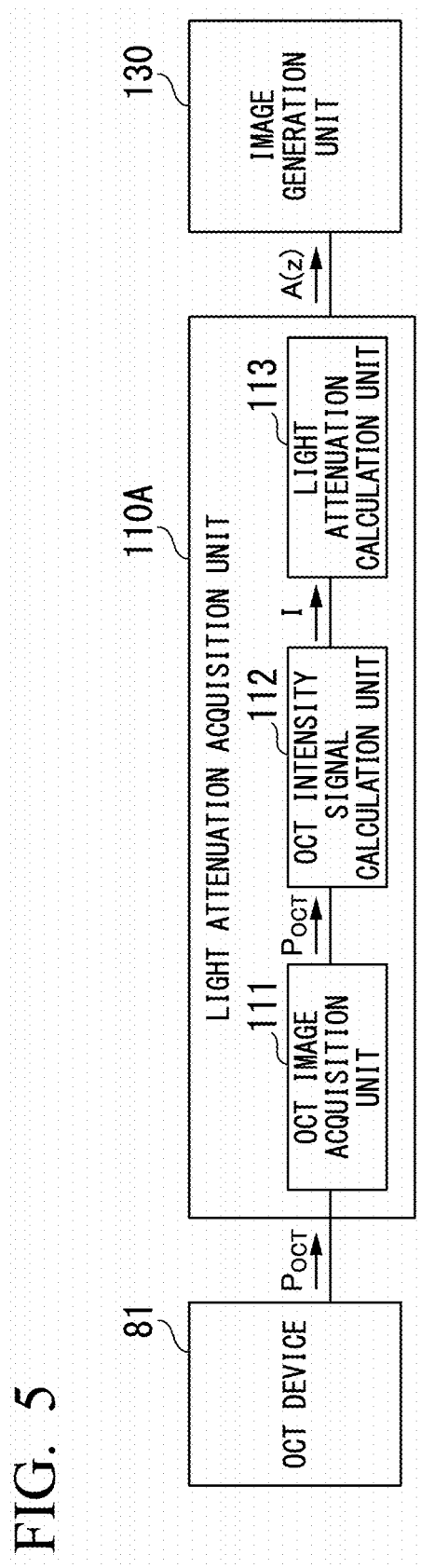
FIG. 5 is a diagram illustrating an example of a functional configuration of a light attenuation acquisition unit according to a second embodiment.

FIG. 5 is a diagram illustrating an example of a functional configuration of a light attenuation acquisition unit 110A according to the second embodiment. An example of a functional configuration of the light attenuation acquisition unit 110A is described with reference to the drawing. The light attenuation acquisition unit 110A is a modification example of the light attenuation acquisition unit 110. The same components as those of the light attenuation acquisition unit 110 are denoted by the same reference numerals and signs, and the description thereof may be omitted.

The light attenuation acquisition unit 110A includes an OCT image acquisition unit 111, an OCT intensity signal calculation unit 112, and a light attenuation calculation unit 113. The light attenuation acquisition unit 110A is different from the light attenuation acquisition unit 110 in that a light attenuation A(z) is calculated based on an OCT image $P_{OCT}$ acquired from an OCT device 81.

The OCT image acquisition unit 111 acquires the OCT image $P_{OCT}$ from the OCT device 81. The OCT image $P_{OCT}$ is a tomographic image that captures an object. That is, the OCT image acquisition unit 111 acquires the OCT image $P_{OCT}$ that captures the object.

The OCT intensity signal calculation unit 112 processes collected optical signals and calculates an OCT signal. Here, a method of calculating an OCT intensity signal I is described.

First, there is the Lambert-Beer's law as a physical model for obtaining light attenuation. The irradiation intensity of light at a predetermined depth is represented by Equation (2) below based on the Lambert-Beer's law.

[Math. 3]

$$L(z) = L_0 e^{-\int_0^z \mu(u)du} \qquad (2)$$

$L_0$ in Equation (2) indicates the irradiation intensity of light on the surface of the object. $\mu(z)$ indicates an attenuation coefficient at a depth z. Based on Equation (2), a light attenuation A(z) at the depth z is represented by Equation (3) below.

[Math. 4]

$$A(z) = \frac{L(z)}{L_0} = e^{-\int_0^z \mu(u)du} \quad (3)$$

Here, generally, an OCT intensity signal I(z) at the depth z is represented by Equation (4) below as a model formula of an intensity at the depth z. Here, the OCT intensity signal I(z) of which depth-dependent signal attenuation, noise offset, and confocal effect are corrected and thus being proportional to a detected light intensity is generally used.

[Math. 5]

$$I(z) = \alpha\beta\mu(z)L_0 e^{-2\int_0^z \mu(u)du} \quad (4)$$

The OCT intensity signal calculation unit 112 calculates the OCT intensity signal I based on Equation (4).

The light attenuation calculation unit 113 calculates the light attenuation A(z) based on the calculated OCT intensity signal I. Here, a method of calculating the light attenuation A(z) is described.

First, the light attenuation A(z) obtained from Equation (3) and Equation (4) is represented by Equation (5) below.

[Math. 6]

$$A(z) = \sqrt{\frac{1}{\alpha\beta L_0}\frac{I(z)}{\mu(z)}} = \sqrt{\frac{1}{\alpha\beta L_0}2\int_Z^\infty I(u)du} \quad (5)$$

Here, Equation (6) can be obtained by substituting A(0)=1 into Equation (5). A(0)=1 is an assumption in a case where a light irradiation intensity is constant at a minimum depth of an upper part of an image.

[Math. 7]

$$\frac{\alpha\beta L_0}{2} = \int_0^\infty I(u)du \quad (6)$$

According to Equation (6), the light attenuation A(z) can be represented as Equation (7) below.

[Math. 8]

$$A(z) = \sqrt{\frac{\int_z^\infty I(u)du}{\int_0^\infty I(u)du}} \quad (7)$$

Equation (7) is a function for the OCT intensity signal I(z). That is, the light attenuation calculation unit 113 can calculate the light attenuation A(z) from the OCT intensity signal I(z) by applying Equation (7).

Note that, when Equation (7) is calculated, a condition that the entire measurement light is attenuated within an imaging depth range may be used. I(z>$z_{max}$)=0 is established, and an infinite integration can be replaced with a finite range of integration. $z_{max}$ indicates the maximum depth that can be imaged by OCT.

Summary of Second Embodiment

According to the above-described embodiment, the light attenuation acquisition unit 110A includes the OCT image acquisition unit 111, the OCT intensity signal calculation unit 112, and the light attenuation calculation unit 113 to calculate a light attenuation A(z) based on an OCT signal $S_{OCT}$ or an OCT image $P_{OCT}$. That is, the light attenuation acquisition unit 110A can calculate the light attenuation A(z) based on the OCT signal $S_{OCT}$ or OCT image $P_{OCT}$ acquired from the OCT device 81.

Thus, according to the present embodiment, it is possible to easily calculate the light attenuation A(z) based on the OCT signal $S_{OCT}$ or OCT image $P_{OCT}$ acquired from the OCT device 81 without using other complex devices.

Further, according to the above-described embodiment, the light attenuation acquisition unit 110A obtains Equation (6) based on an assumption in a case where A(0)=1. The light attenuation acquisition unit 110A obtains Equation (7), that is, the light attenuation A(z) by applying Equation (6) to Equation (5). That is, in the light attenuation acquisition unit 110A, the OCT signal $S_{OCT}$ or OCT image $P_{OCT}$ acquired by the OCT image acquisition unit 111 is calculated based on an assumption that the OCT signal $S_{OCT}$ or OCT image $P_{OCT}$ is captured, in the direction in which the OCTA tomographic image is layered, up to a depth z' (z'<$z_{max}$) at which the entire measurement light is attenuated.

Thus, according to the present embodiment, an arithmetic operation is performed based on an assumption in a case where A(0)=1, and thus it is possible to calculate the light attenuation A(z) by a simple calculation equation without using a complex calculation equation.

Third Embodiment

Hereinafter, a third embodiment of the present invention will be described with reference to the drawings.

Figure 6:
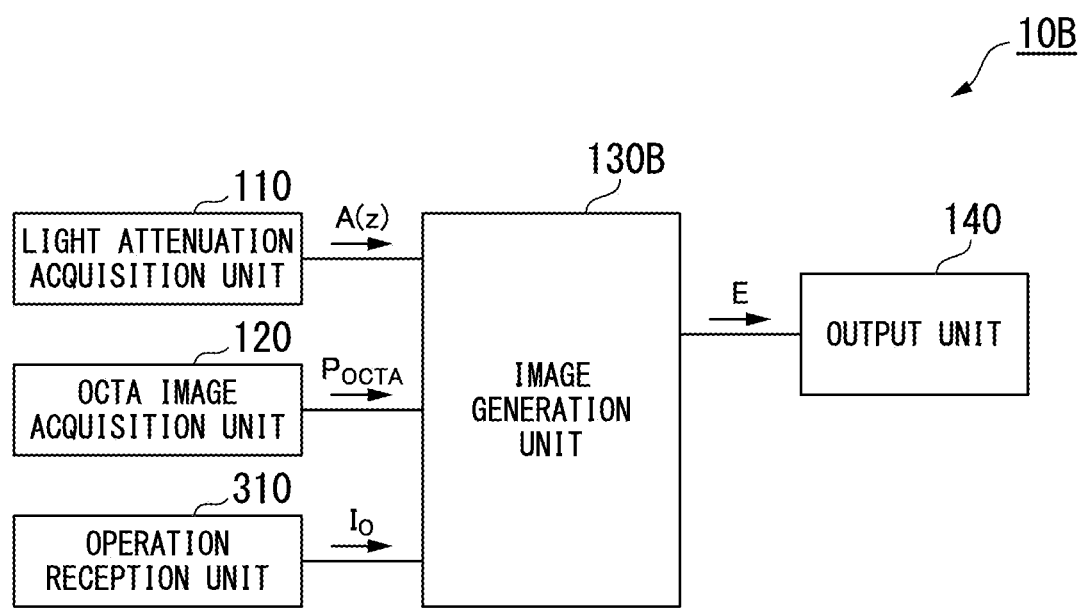
FIG. 6 is a diagram illustrating an example of a functional configuration of an image generation device according to a third embodiment.

FIG. 6 is a diagram illustrating an example of a functional configuration of an image generation device 10B according to the third embodiment. The image generation device 10B is different from the image generation device 10 in that the image generation device 10B further includes an operation reception unit 310 and an image generation unit 130B instead of the image generation unit 130. The same components as those of the image generation device 10 are denoted by the same reference numerals and signs, and the description thereof may be omitted.

The operation reception unit 310 receives an operation $I_O$ from a user. The user is a person who uses the image generation device 10, and the user is a doctor, for example, in a case where the image generation device 10 is used in a medical facility such as an ophthalmic facility. The user's operation $I_O$ is an operation, such as an operation of inputting characters to a character input device such as a keyboard, an operation of pressing a button, or an operation of rotating a dial.

The operation reception unit 310 receives the user's operation $I_O$ to acquire a value indicating the degree of coloring in a colored image E. The value indicating the degree of coloring in the colored image E is specifically an index of the light attenuation A(z) of the Equation (1) used at the time of calculating the colored image E. That is, according to the present embodiment, the index of the light attenuation A(z) used at the time of calculating the colored image E is acquired by the user's operation $I_O$, thereby adjusting the degree of coloring in the colored image E.

The image generation unit 130B generates the colored image E by setting a value acquired by the user's operation $I_O$ using the operation reception unit 310 to be an index of the light attenuation A(z). Specifically, the image generation unit 130B generates the colored image E by applying a value acquired by the operation reception unit 310 as an index of the light attenuation A(z) in Equation (1).

That is, in the present embodiment, the image generation unit 130B generates the colored image E based on the light attenuation A(z) acquired by the light attenuation acquisition unit 110, an OCTA signal $S_{OCTA}$ or OCTA image $P_{OCTA}$ acquired by the OCTA image acquisition unit 120, and the user's operation $I_O$ acquired by the operation reception unit 310.

The output unit 140 outputs the colored image E generated by the image generation unit 130B to the display device 86.

Note that, in a case where the user confirms the colored image E displayed on the display device 86 and then determines that the visibility of the colored image E is poor, the user may adjust the visibility of the colored image E again. In such a case, a re-operation detection unit 310(??) acquires an operation $I_O$ of the user again, and thus the image generation unit 130B generates a new colored image E based on the user's operation $I_O$. The output unit 140 outputs the colored image E newly generated by the image generation unit 130B to the display device 86.

Summary of Third Embodiment

According to the above-described embodiment, the image generation device 10B includes the image generation unit 130B to generate a colored image E by integrating a value based on the power of a light attenuation A(z) in the stacking direction of an OCT image $P_{OCT}$ (tomographic image). In the arithmetic operation of the colored image E, the intensity of a blood flow can be expressed by varying an index of the light attenuation A(z). Thus, according to the present embodiment, the intensity of a blood flow can be easily expressed.

In addition, according to the above-described embodiment, the image generation device 10B further includes the operation reception unit 310 to acquire an operation $I_O$ from a user. The image generation unit 130B generates a colored image E further based on the acquired user's operation $I_O$. Thus, according to the present embodiment, even when it is difficult for the user to recognize the structure or blood flow of an object from the colored image E output by the image generation device 10B, the degree of the colored image E can be adjusted by the user. That is, according to the present embodiment, the image generation device 10B can provide a colored image E having good visibility to the user. According to the present embodiment, the image generation device 10B can adjust the visibility of the colored image E by the user.

Further, in a case where the image generation device 10 is applied to various test objects, the value of an index of an optimal light attenuation A(z) may vary depending on an application. According to the present embodiment, it is possible to output suitable colored images E corresponding to various applications by including the operation reception unit 310.

Fourth Embodiment

The first to third embodiments described above will be described in more detail as a fourth embodiment.

First, an object of an image generation device 10 according to the present embodiment is to generate and output a two-dimensional image from which a caution-needed location where a patient is suspected to exist can be easily found, based on an OCT signal $S_{OCT}$ or OCT image $P_{OCT}$ which is three-dimensional data. According to the two-dimensional image output by the image generation device 10, abnormalities in tissue (changes in light attenuation) and vascular networks (distribution of blood flow signals) can be discriminated simultaneously.

Here, in a case where an object is an eyeball, abnormalities of an object such as retinal morphological changes (thickening, edema, and the like) and decreased scattering intensity are known to occur, in addition to abnormalities of an object in the vascular networks. In particular, a pigment epithelium layer plays an important role in the metabolism of the retina and is a tissue having an extremely strong light scattering property. Thus, abnormalities of the pigment epithelium layer cause a decrease in scattering intensity. Thus, there is a demand for easily finding abnormalities of the pigment epithelium layer.

In the related art, a doctor specifies a three-dimensional position of a disease by observing a plurality of tomographic images one by one, each of the tomographic images representing a three-dimensional structure of an object. However, there is a problem that the work of confirming the plurality of images one by one requires time and effort.

The doctor can perform screening for ascertaining the presence or absence of a disease by confirming one two-dimensional image output by the image generation device 10.

Figure 7:
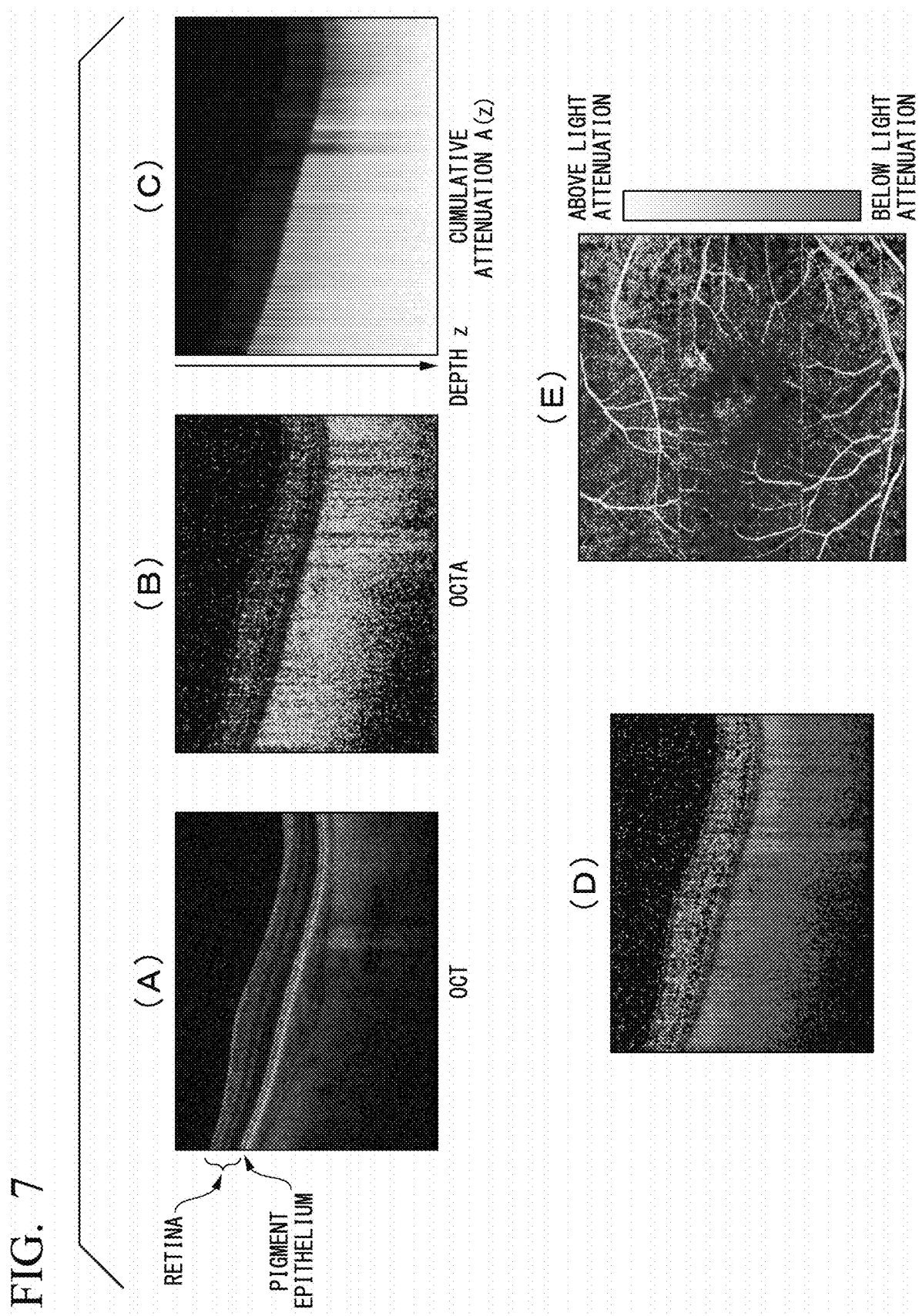
FIG. 7 is a diagram illustrating examples of images that are acquired, on which arithmetic operations have been performed, and which are output by an image generation device according to a fourth embodiment.

FIG. 7 is a diagram illustrating examples of images that are acquired, arithmetically operated, and output by an image generation device according to the fourth embodiment. The processing of the image generation device 10 according to the fourth embodiment will be described with reference to the images illustrated in the drawing.

FIG. 7(A) illustrates an example of an OCT image $P_{OCT}$ generated based on an OCT signal $S_{OCT}$ acquired by an OCT device 81. In the same drawing, the retina and the pigment epithelium are illustrated. FIG. 7(B) illustrates an example of an OCTA image $P_{OCTA}$ acquired by an OCTA image acquisition unit 120. FIG. 7(C) illustrates an example of a light attenuation A(z) calculated based on OCT signal $S_{OCT}$ and Equation (7) described above. FIG. 7(D) illustrates an image colored by the image generation device 10 by determining brightness (that is weighting) based on the OCTA image $P_{OCTA}$ and determining a color based on the light attenuation A(z). FIG. 7(E) illustrates an image generated by integrating the colored image in the z direction by the image generation device 10.

The image generation device 10 can express cumulative attenuation of light by colors by performing the above-described processing. Further, the image generation device 10 can express a blood flow signal by brightness. Thus, according to the image generation device 10, it is possible to easily discriminate a decrease in light attenuation of a pigment epithelium. In addition, according to the image generation device 10, it is possible to easily discriminate angiogenesis above the pigment epithelium. In addition, according to the image generation device 10, it is possible to easily discriminate the generation of a high light attenuation tissue in the retina.

According to the present embodiment, the image generation device 10 expresses a relative depth with respect to a high light attenuation tissue by cumulative attenuation of light, rather than polarization uniformity of light. Here, a change in polarization uniformity is specific to a melanin pigment and a fiberized tissue. However, light attenuation occurs due to various tissues. Thus, according to the present embodiment, the image generation device 10 is based on cumulative attenuation of light instead of polarization uniformity of light, and thus tissue specificity is low.

In addition, according to the present embodiment, the image generation device 10 can generate a two-dimensional image based on information acquired by a commercially available OCTA instrument.

Effects of Embodiments

Effects of the embodiments will be described with reference to FIGS. 8 to 14. An example of an image according to the related art and problems of the related art will be described with reference to FIGS. 8 and 9, and an example of an image according to the present embodiment and effects of the present embodiment will be described with reference to FIGS. 10 to 14.

Figure 8:
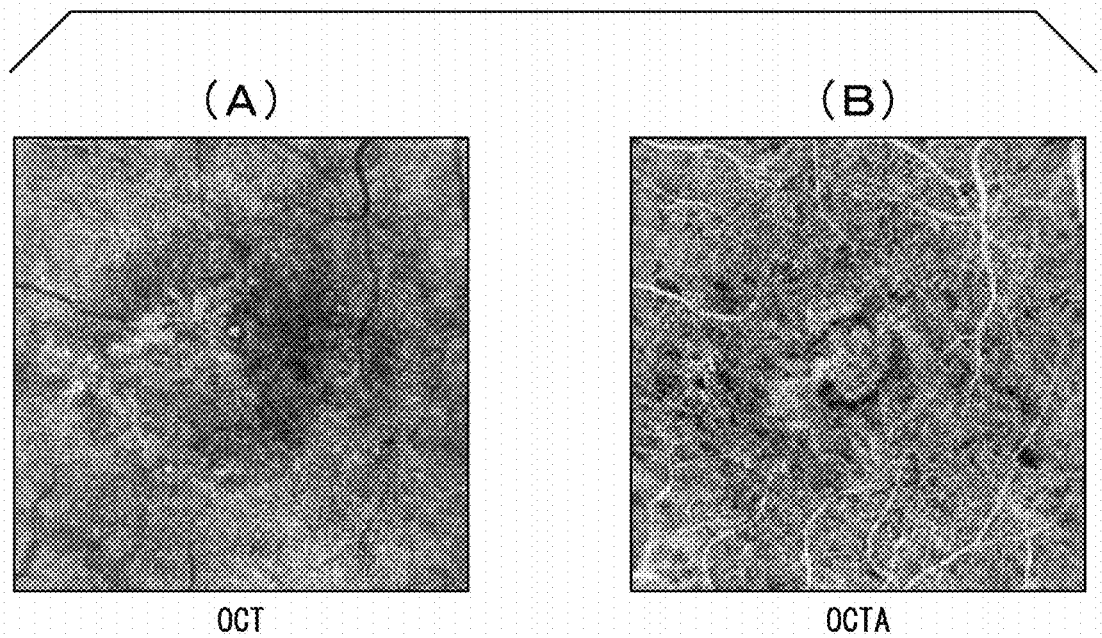
FIG. 8 is a diagram illustrating examples of an OCT image and an OCTA image according to the related art.

FIG. 8 is a diagram illustrating examples of an OCT image and an OCTA image according to the related art. FIG. 8(A) illustrates an example of an OCT image of an eyeball, and FIG. 8(B) illustrates an example of an OCTA image of the eyeball. As illustrated in the drawing, according to the related art, it is difficult to specify the location of a disease from one two-dimensional image. In addition, according to the related art, in order to specify the location of a disease, a plurality of tomographic images can be confirmed one by one, but there is a problem that conforming the plurality of tomographic images one by one requires a lot of time and effort.

Figure 9:
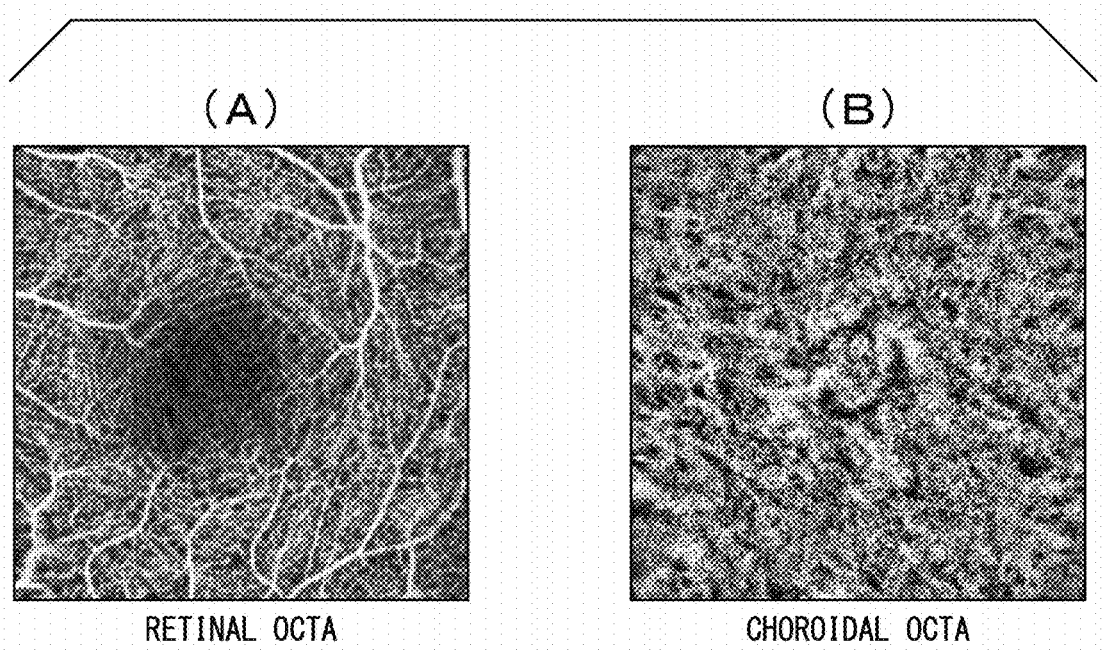
FIG. 9 is a diagram illustrating an example of an image in a case where the image is segmented in a depth direction according to the related art.

FIG. 9 is a diagram illustrating an example of an image in a case where the image is segmented in a depth direction according to the related art. FIG. 9(A) is an OCTA image (Retinal OCA) when only the retina of the fundus is removed, and FIG. 9(B) is an OCTA image (Choroidal OCA) when only the choroid is removed.

In this manner, it is possible to ascertain a tissue having an abnormality by simply segmenting the OCTA image in the depth direction. Further, it is possible to estimate that there is an abnormal blood flow at a location deeper than a position segmented as a pigment epithelium with reference to the Choroidal OCTA, that is, FIG. 9(B). However, it is not possible to ascertain even the state (light attenuation) of the pigment epithelium. Further, there is a need to perform accurate tissue segmentation as a problem in a case where the OCTA image is simply segmented in the depth direction. In the case of an abnormal tissue, the structure of the tissue may be collapsed, the boundary of the tissue may not be clear, or the boundary of the tissue may be eliminated. Thus, when the OCTA image is simply segmented in the depth direction, it is not clear what the segmentation result means, and there is a problem in that a radiologist has to view and interpret the image.

Figure 10:
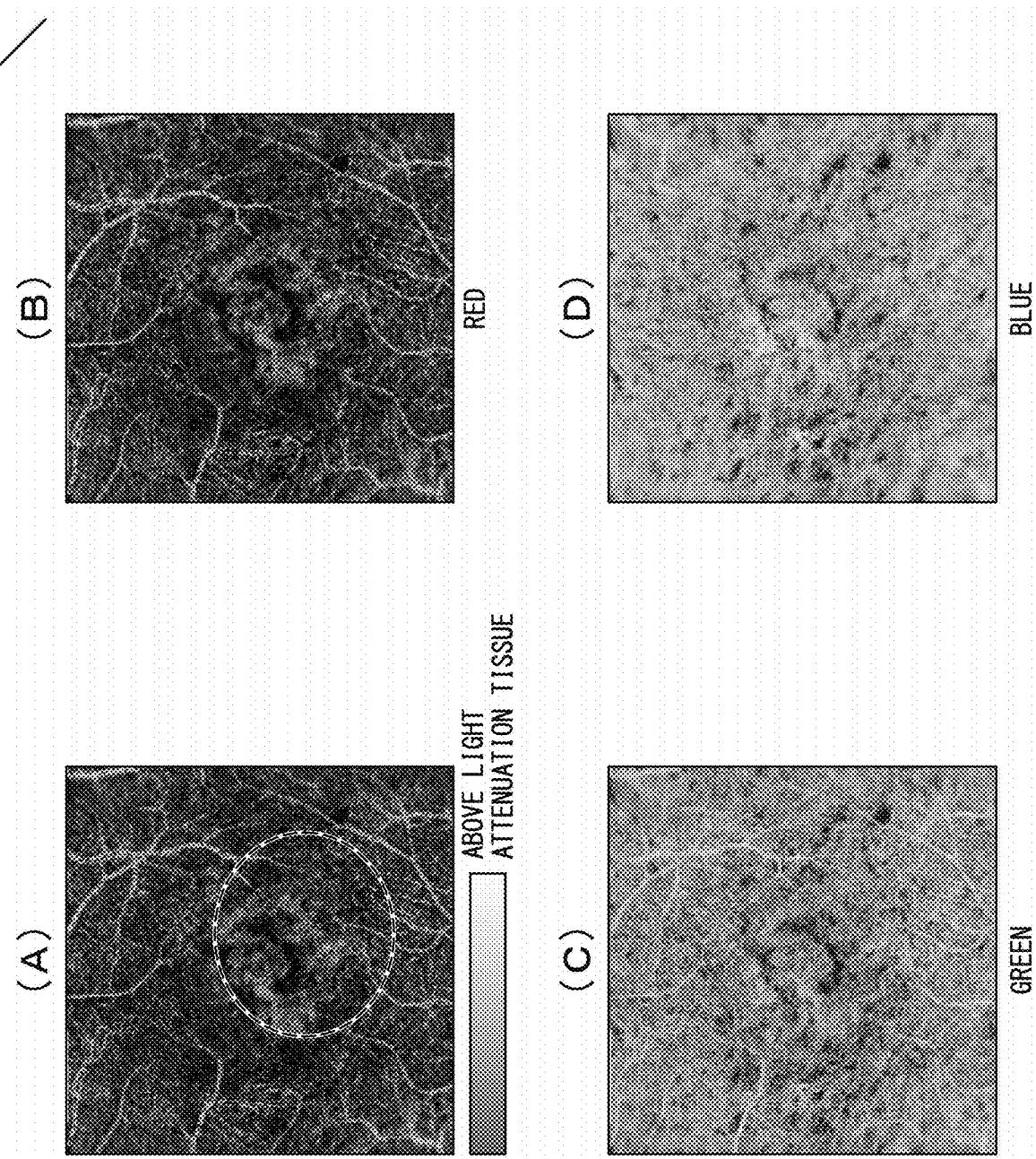
FIG. 10 is a diagram illustrating an example of a colored image output by the image generation device according to the fourth embodiment.

FIG. 10 is a diagram illustrating an example of a colored image output by the image generation device according to the fourth embodiment. An example of a colored image output by the image generation device 10 will be described with reference to the drawing. FIG. 10(A) illustrates a colored image output by the image generation device 10. In the drawing, a color corresponding to a depth is colored. From the drawing, it is possible to recognize that a portion surrounded by a circle in the drawing includes a disease. FIG. 10(B), FIG. 10(C), and FIG. 10(D) are images obtained by extracting red (R), green (G), and blue (B) components from the colored image of FIG. 10(A) in order to improve visibility.

Next, a cross-section of a location recognized as a location including a disease will be described with reference to FIGS. 11 and 12.

Figure 11:
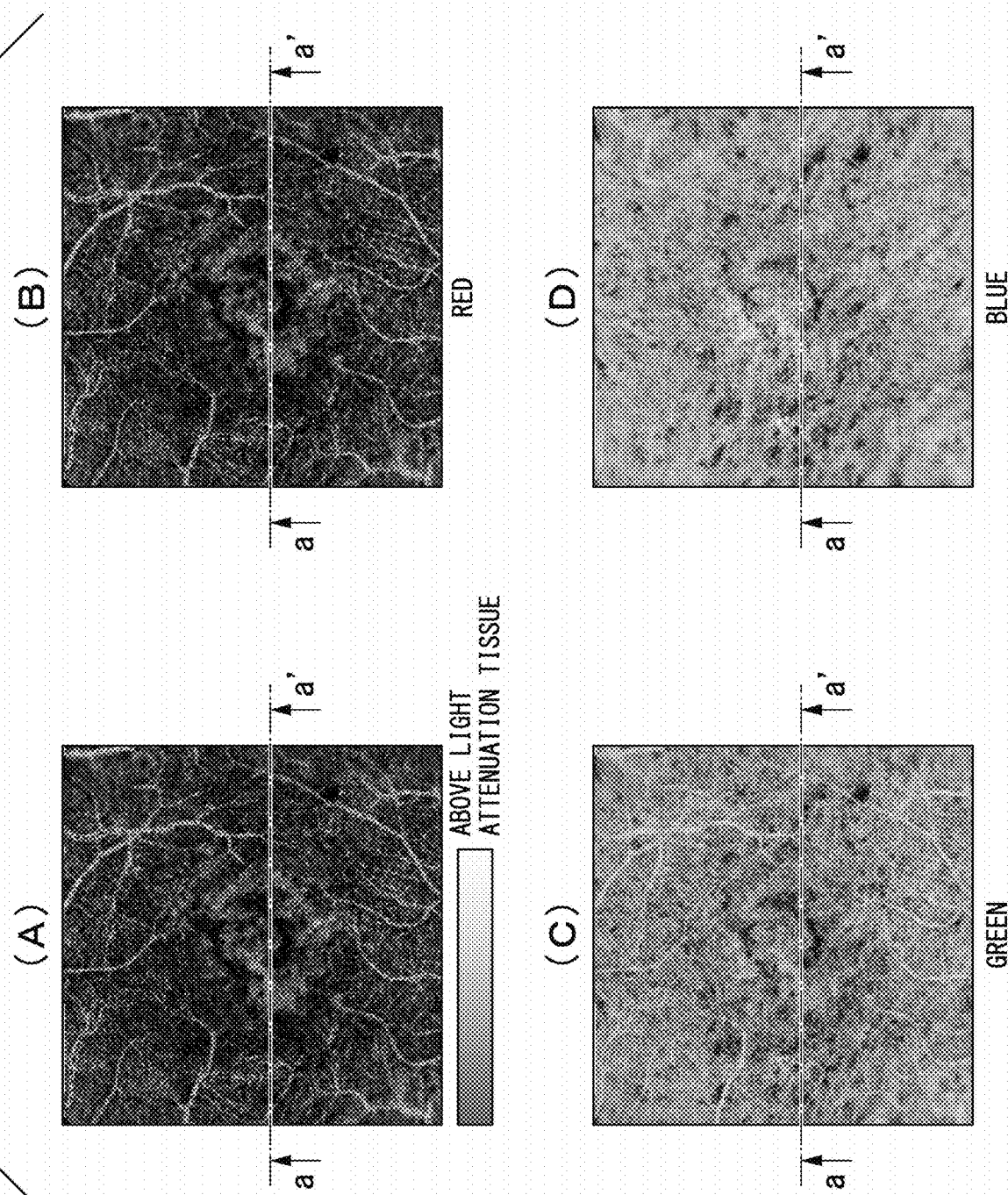
FIG. 11 is a diagram illustrating a first cross-section of the colored image output by the image generation device according to the fourth embodiment.

FIG. 11 is a diagram illustrating a first cross-section of a colored image output by the image generation device according to the fourth embodiment. FIGS. 11(A) to 11(D) correspond to FIGS. 10(A) to 10(D), respectively. Each of a-a' cross-sections illustrated in the drawings is a cross-section of a location specified as a location including a disease by the colored image output by the image generation device 10. The a-a' cross-sections illustrated in FIGS. 11(A) to 11(D) are illustrated in FIG. 12.

Figure 12:
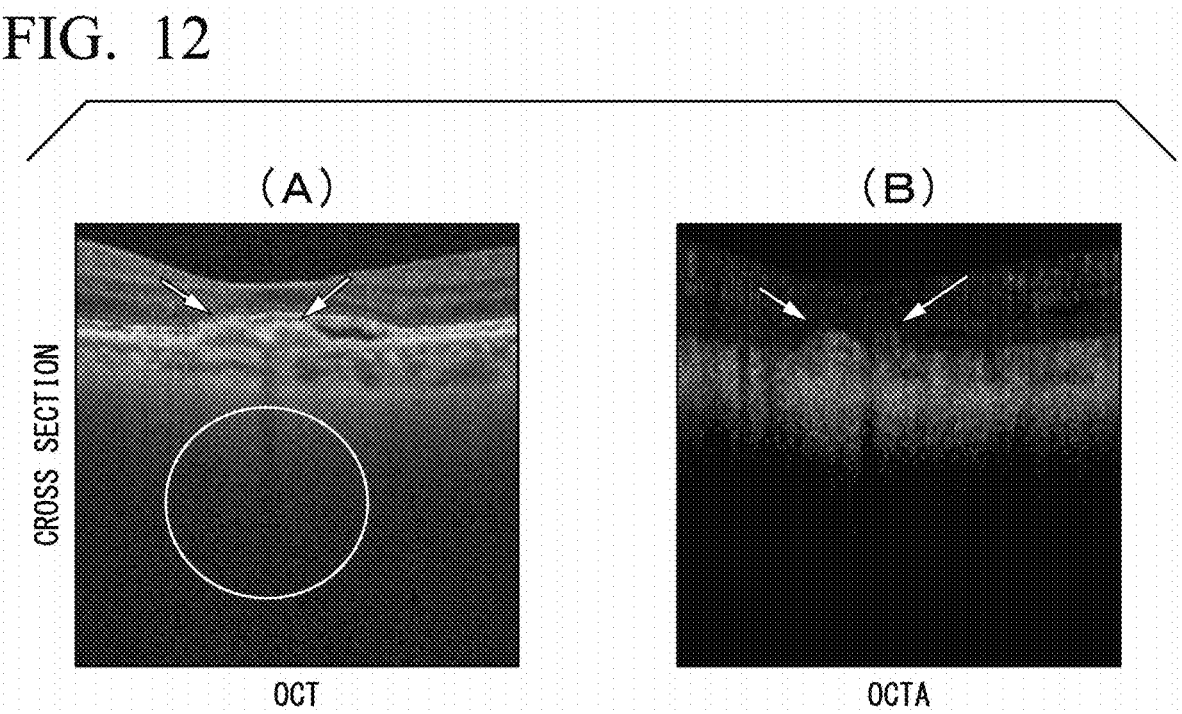
FIG. 12 is a diagram illustrating an OCT image and an OCTA image in the first cross-section of the colored image output by the image generation device according to the fourth embodiment.

FIG. 12 is a diagram illustrating an OCT image and an OCTA image in a first cross-section in a colored image output by the image generation device according to the fourth embodiment. FIG. 12(A) illustrates an OCT image of the a-a' cross-section illustrated in each of FIGS. 11(A) to 11(D), and FIG. 12(B) illustrates an OCTA image thereof. From FIGS. 12(A) and 12(B), it can be understood that an abnormal blood flow signal is located above the choroid and below the pigment epithelium. In addition, from FIG. 12(A), it can be understood that a signal of the choroid is increased due to a decrease in light attenuation of the pigment epithelium on the abnormal blood flow signal (see an elliptical portion in the drawing). Thus, it is considered that an abnormal finding has occurred at a location specified as a location including a disease by the image generation device 10.

Figure 13:
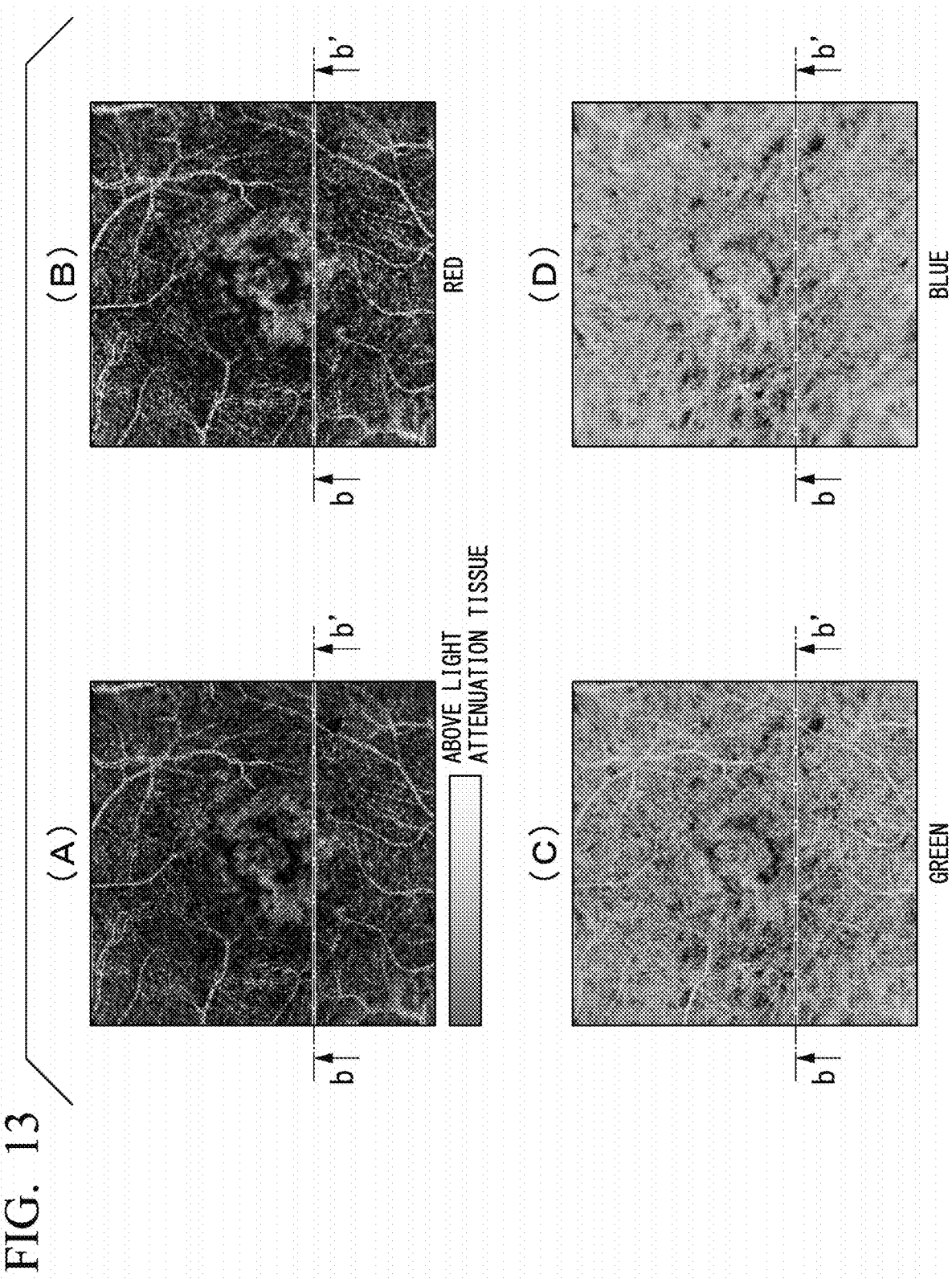
FIG. 13 is a diagram illustrating a second cross-section of the colored image output by the image generation device according to the fourth embodiment.

FIG. 13 is a diagram illustrating a second cross-section of a colored image output by the image generation device according to the fourth embodiment. A b-b' cross-section different from the a-a' cross-section will be described with reference to the drawing. FIGS. 13(A) to 13(D) correspond to FIGS. 10(A) to 10(D), respectively. The b-b' cross-section illustrated in the drawing is a cross-section of a location specified as a location including a disease by the colored image output by the image generation device 10. The b-b' cross-sections illustrated in FIGS. 13(A) to 13(D) are illustrated in FIG. 14.

Figure 14:
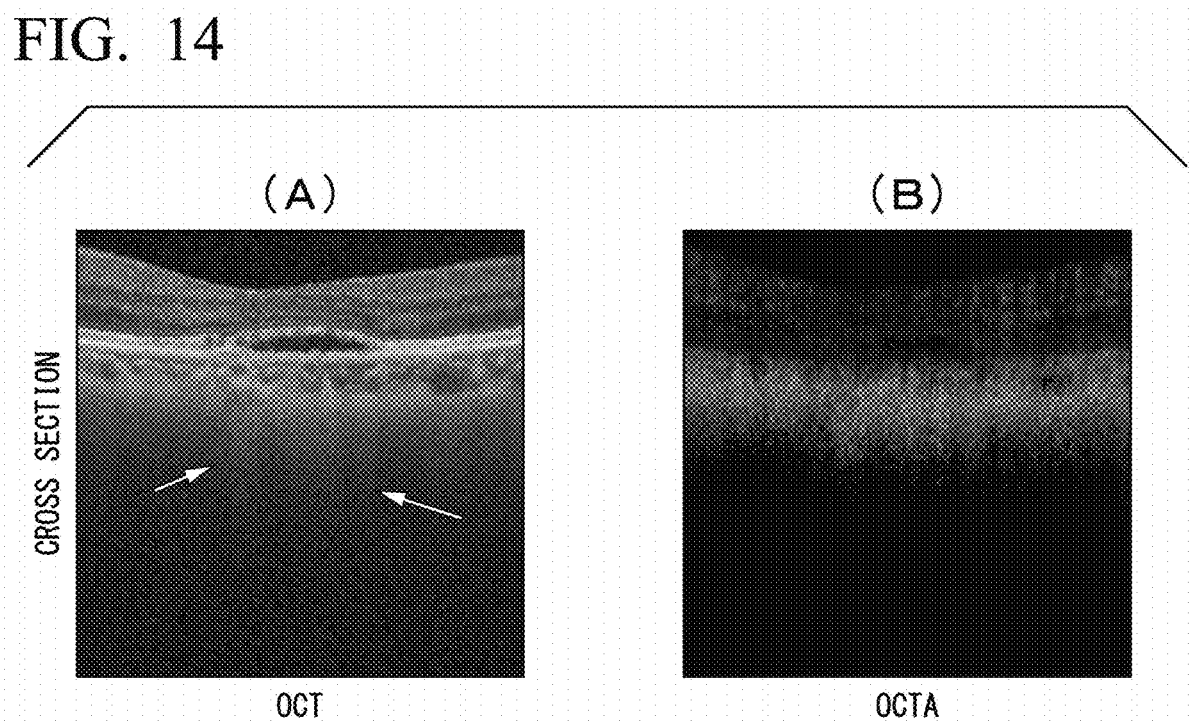
FIG. 14 is a diagram showing an OCT image and an OCTA image in the second cross section of the colored image output by the image generation device according to the fourth embodiment.

FIG. 14 is a diagram illustrating an OCT image and an OCTA image in the second cross-section in the colored image output by the image generation device according to the fourth embodiment. FIG. 14(A) illustrates an OCT image of the b-b' cross-section illustrated in each of FIGS. 13(A) to 13(D), and FIG. 14(B) illustrates an OCTA image thereof. From FIG. 14(A), it can be understood that light attenuation of the pigment epithelium is decreased, and the depth of invasion into the choroid is increased. Thus, it is considered that an abnormal finding has occurred at a location specified as a location including a disease by the image generation device 10.

According to the embodiment described above, it is possible to specify the position of a disease by one colored image generated by the image generation device 10. Thus, a doctor can easily specify an approximate position of a disease without needing to screen a plurality of tomographic images one by one, each of the tomographic images representing a three-dimensional structure of an object. Thus, the image generation device 10 generates an image from which information of a three-dimensional space of an object can be easily obtained.

Note that all or some of the functions included in the image generation device 10 described above may be recorded in a computer-readable recording medium as a program, and this program may be executed by a computer system. It is assumed that the computer system includes hardware such as an OS and peripheral equipment. In addition, examples of the computer-readable recording medium include portable mediums such as a flexible disk, a magneto-optical disk, a read only memory (ROM), and a CD-ROM, storage devices such as a hard disk incorporated in the computer system, and a volatile memory (random access memory: RAM) included in a server or the like on a network such as the Internet. Note that the volatile memory is an example of a recording medium that stores a program for a certain period of time.

Further, the program described above may be transmitted to another computer system by a transmission medium, for example, a network such as the internet, or a communication line such as a telephone line.

In addition, the program described above may be a program that realizes all or some of the functions described above. Further, the program that realizes some of the functions described above may be a program that can realize the above-described functions in combination with a program recorded in advance in the computer system, that is, a so-called differential program.

Although the embodiments of the present invention have been described above with reference to the drawings, the specific configurations are not limited to the above-described embodiments, and changes of design and the like are also included without departing from the scope of the present invention.

REFERENCE SIGNS LIST

1 Image generation system
10 Image generation device
81 OCT device
86 Display device
110 Light attenuation acquisition unit
120 OCTA image acquisition unit
130 Image generation unit
140 Output unit
111 OCT image acquisition unit
112 OCT intensity signal calculation unit
113 Light attenuation calculation unit
310 Operation reception unit
A(z) Light attenuation
$P_{OCT}$ OCT image
$P_{OCTA}$ OCTA image
$S_{OCT}$ OCT signal
$S_{OCTA}$ OCTA signal
E. Colored image
T Color table
I OCT intensity signal

What is claimed is:

1. An image generation device comprising:
a tomographic image acquisition unit configured to acquire an OCTA tomographic image that captures a distribution of a blood flow of an object;
a light attenuation acquisition unit configured to acquire a light attenuation of measurement light emitted to the object in a direction in which the OCTA tomographic image is layered; and
an image generation unit configured to generate a light attenuation-blood flow distribution chart indicating a distribution of the light attenuation based on the acquired OCTA tomographic image and the light attenuation,
wherein the light attenuation acquisition unit includes:
an OCT image acquisition unit configured to acquire an OCT image that captures the object,
an OCT intensity signal calculation unit configured to calculate an OCT intensity signal based on the acquired OCT image, and
a light attenuation calculation unit configured to calculate the light attenuation based on the calculated OCT intensity signal.

2. The image generation device according to claim 1, wherein the light attenuation-blood flow distribution chart is a two-dimensional image.

3. The image generation device according to claim 2, wherein the two-dimensional image is an image colored in accordance with a level of light attenuation.

4. The image generation device according to claim 3, further comprising:
an output unit configured to output the generated light attenuation-blood flow distribution chart.

5. The image generation device according to claim 1, further comprising:
an output unit configured to output the generated light attenuation-blood flow distribution chart.

6. The image generation device according to claim 1 further comprising:
an specifying unit configured to specify a location where the disease is suspected to exist based on the light attenuation.

7. The image generation device according to claim 6, wherein the specifying unit generates an image that specify the location where the disease is suspected to exist by integrating the light attenuation-blood flow distribution chart in the z-direction.

8. An image generation device comprising:
a tomographic image acquisition unit configured to acquire an OCTA tomographic image that captures a distribution of a blood flow of an object;
a light attenuation acquisition unit configured to acquire a light attenuation of measurement light emitted to the object in a direction in which the OCTA tomographic image is layered; and
an image generation unit configured to generate a light attenuation-blood flow distribution chart indicating a distribution of the light attenuation based on the acquired OCTA tomographic image and the light attenuation,
wherein the image generation unit generates the light attenuation-blood flow distribution chart by integrating a value based on a power of the light attenuation in a direction in which the OCTA tomographic image is layered.

9. The image generation device according to claim 8, further comprising:
an operation reception unit configured to receive an operation from a user,
wherein the image generation unit generates the light attenuation-blood flow distribution chart by setting an index of the light attenuation equal to a value acquired through the operation from the user using the operation reception unit.

10. An image generation device comprising:
a tomographic image acquisition unit configured to acquire an OCTA tomographic image that captures a distribution of a blood flow of an object;
a light attenuation acquisition unit configured to acquire a light attenuation of measurement light emitted to the object in a direction in which the OCTA tomographic image is layered; and
an image generation unit configured to generate a light attenuation-blood flow distribution chart indicating a distribution of the light attenuation based on the acquired OCTA tomographic image and the light attenuation, wherein the image generation unit calculates a colored image E, which is the light attenuation-blood flow distribution chart, in accordance with Equation (100):

[Math. 1]

$$E = \Sigma_z \text{OCTA}(z) \times T[A^{10}(z)] \quad (100)$$

wherein, T represents a predetermined function, A(z) represents the light attenuation, z represents a position in a direction in which the OCTA tomographic image is layered, and OCTA(z) represents an OCTA signal.

11. A non-transitory computer-readable storage medium storing a program causing a computer to perform:
   acquiring an OCTA tomographic image that captures a distribution of a blood flow of an object;
   acquiring a light attenuation of measurement light emitted to the object in a direction in which the OCTA tomographic image is layered; and
   generating a light attenuation-blood flow distribution chart indicating a distribution of the light attenuation based on the acquired OCTA tomographic image and the light attenuation,
   wherein the light attenuation acquisition unit includes
      acquiring an OCT image that captures the object,
      calculating an OCT intensity signal based on the acquired OCT image, and
      calculating the light attenuation based on the calculated OCT intensity signal.

12. An image generation method comprising:
   acquiring an OCTA tomographic image that captures a distribution of a blood flow of an object;
   acquiring a light attenuation of measurement light emitted to the object in a direction in which the OCTA tomographic image is layered; and
   generating a light attenuation-blood flow distribution chart indicating a distribution of the light attenuation based on the acquired OCTA tomographic image and the light attenuation,
   wherein the light attenuation acquisition unit includes
      acquiring an OCT image that captures the object,
      calculating an OCT intensity signal based on the acquired OCT image, and
   calculating the light attenuation based on the calculated OCT intensity signal.

* * * * *